(12) United States Patent
Varis

(10) Patent No.: US 7,198,528 B2
(45) Date of Patent: Apr. 3, 2007

(54) MOTOR UNIT FOR A SHIP

(75) Inventor: Jukka Varis, Espoo (FI)

(73) Assignee: ABB OY, Helsinki (FI)

( * ) Notice: Subject to any disclaimer, the term of this patent is extended or adjusted under 35 U.S.C. 154(b) by 0 days.

(21) Appl. No.: 10/181,215

(22) PCT Filed: Jan. 26, 2001

(86) PCT No.: PCT/FI01/00077

§ 371 (c)(1),
(2), (4) Date: Nov. 13, 2002

(87) PCT Pub. No.: WO01/54973

PCT Pub. Date: Aug. 2, 2001

(65) Prior Publication Data

US 2003/0236036 A1 Dec. 25, 2003

(30) Foreign Application Priority Data

Jan. 28, 2000 (FI) .................................. 20000190

(51) Int. Cl.
B60L 9/00 (2006.01)

(52) U.S. Cl. ........................................................ 440/6

(58) Field of Classification Search .................... 440/6; 114/151
See application file for complete search history.

(56) References Cited

U.S. PATENT DOCUMENTS

| | | | |
|---|---|---|---|
| 2,714,866 A | | 8/1955 | Pleuger et al. |
| 3,593,050 A | * | 7/1971 | Ware ............................. 310/87 |
| 3,791,331 A | * | 2/1974 | Dilley ............................ 440/6 |
| 3,814,961 A | * | 6/1974 | Nelson et al. ................. 310/87 |
| 3,906,887 A | * | 9/1975 | Kappas ........................... 440/6 |
| RE29,695 E | * | 7/1978 | Blake ............................. 440/6 |
| 4,105,905 A | * | 8/1978 | Barcus ......................... 310/59 |
| 5,101,128 A | * | 3/1992 | Veronesi et al. .............. 310/54 |
| 5,379,714 A | | 1/1995 | Lewis et al. ................. 114/315 |
| 5,417,597 A | | 5/1995 | Levedahl ........................ 440/6 |
| 5,445,545 A | * | 8/1995 | Draper ........................... 440/6 |
| 5,679,045 A | * | 10/1997 | Niemi ............................. 440/6 |
| 6,231,407 B1 | * | 5/2001 | Hein et al. ..................... 440/6 |
| 6,685,516 B2 | * | 2/2004 | Tsuboguchi .................... 440/6 |
| 6,921,303 B2 | * | 7/2005 | Varis ............................. 440/6 |
| 2004/0053545 A1 | * | 3/2004 | Le Flem et al. .......... 440/88 C |

FOREIGN PATENT DOCUMENTS

| | | |
|---|---|---|
| DE | 877 254 | 4/1953 |
| DE | 31 35 556 A1 | 5/1982 |
| DE | 44 40 791 A1 | 5/1996 |
| DE | 198 26 229 | 2/1999 |
| EP | 0 590 867 A1 | 4/1994 |
| EP | 0 816 222 A2 | 1/1998 |

(Continued)

Primary Examiner—Sherman Basinger
(74) Attorney, Agent, or Firm—Arent Fox PLLC

(57) ABSTRACT

An arrangement of a ship's propulsion unit includes a motor unit with a motor housing arranged in the water. A motor and related controls are provided in the motor housing. A propeller is arranged at an end of a motor shaft. The motor unit includes an electrical motor, wherein an entire circumferential surface of the electrical motor is cooled through a casing structure of the motor directly to the water surrounding the motor unit.

21 Claims, 3 Drawing Sheets

FOREIGN PATENT DOCUMENTS

Figure 2A:
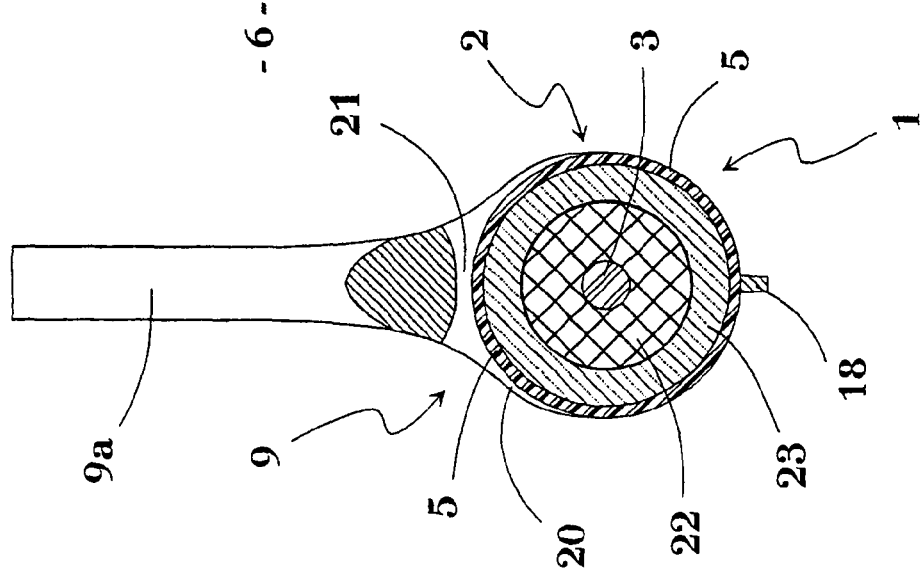

| | | |
|---|---|---|
| EP | 1 010 614 A1 | 6/2000 |
| FI | 76977 | 8/1988 |
| FI | 96590 | 3/1994 |
| FR | 2 823 177 * | 10/2002 |
| WO | WO 97/49605 | 12/1997 |
| WO | WO 99/05023 | 2/1999 |
| WO | WO 99/05024 | 2/1999 |
| WO | WO 99/36312 | 7/1999 |
| WO | WO 01/54973 A1 * | 8/2001 |

* cited by examiner

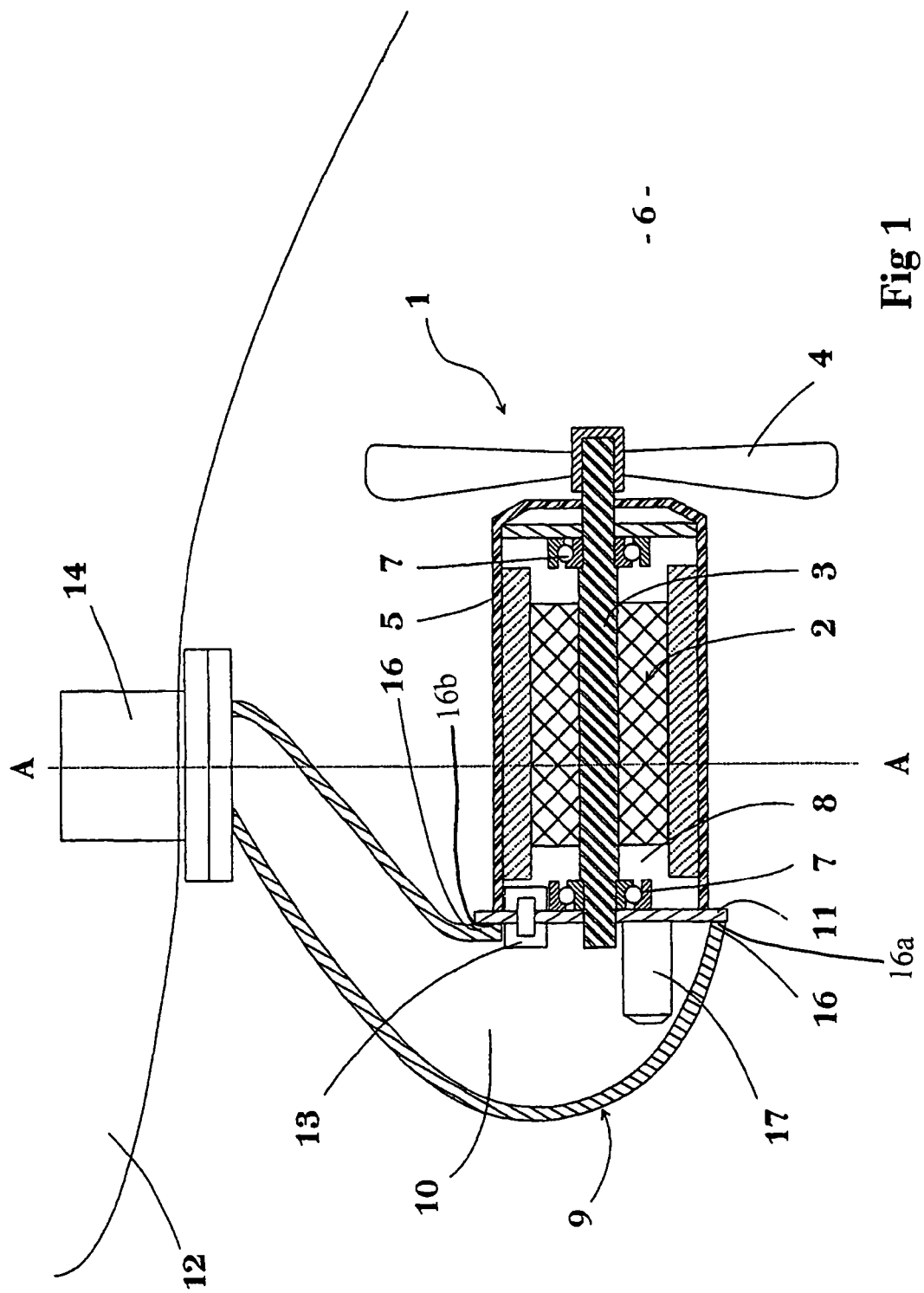

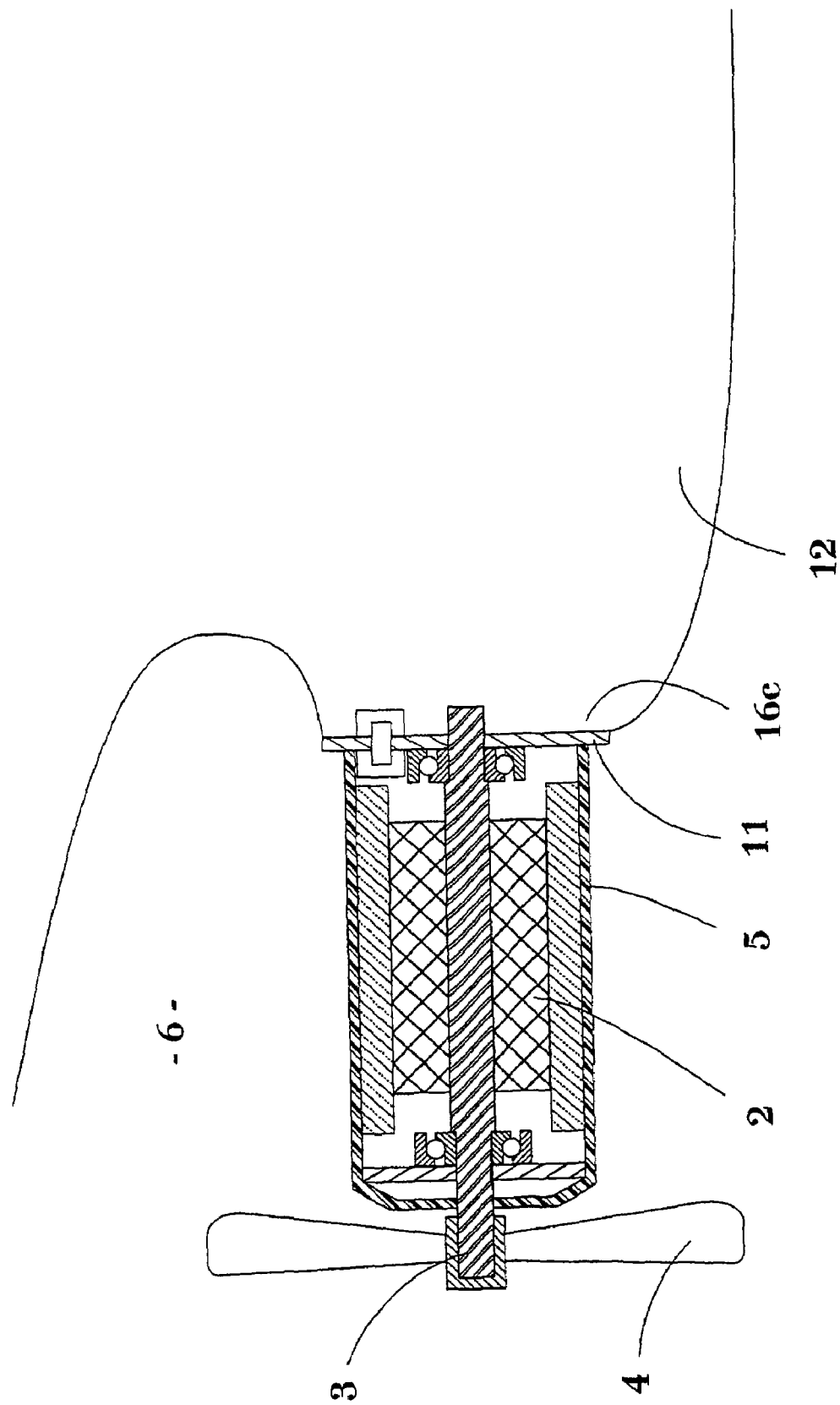

MOTOR UNIT FOR A SHIP

CROSS-REFERENCE TO RELATED APPLICATION

This application is a National Stage entry of International Application No. PCT/IF01/00077, filed Jan. 26, 2001, the entire specification, claims and drawings of which are incorporated herewith by reference.

The present invention relates to a propulsion unit arrangement for a ship, said arrangement including a motor unit located in the water and motor and control devices related thereto as well as a propeller arranged at the motor's shaft.

A conventional motor arrangement in a ship comprises a motor arranged within the ship's hull and a propeller arranged on the end of a motor shaft which extends in a watertight manner through the ship's hull. As the propeller rotates it brings water surrounding the ship into motion and thus creates a reaction force which thrusts the ship forwards. Said motor can be a directly employed diesel engine or like combustion engine or, favorably, an electric motor to which necessary electric power is supplied by a conventional combustion engine, a gas turbine, a nuclear power plant or the like. The steering of such ships is conventionally being arranged so that a pivoting rudder is provided in the propeller's wake. said rudder deflecting the wake and thus creating a lateral force component in relation to the longitudinal direction of the ship.

Other types of so called propulsion units are also known, wherein the propeller as such can be pivoted for the purpose of steering the ship. This pivoting motion can be accomplished by means of a rather complicated shaft arrangement, or in such a way that the propeller is arranged at the shaft of a motor which as such is arranged to be rotatable around a vertical axis. This latter arrangement is called an azimuthing propulsion device, and such a device is described in, for example, the applicant's Finnish patent No. 76977, which device is being marketed by the applicant under the trademark AZIPOD.

Usually, in the azimuthing propulsion devices of today an electric motor known per se is arranged in a motor housing, which is part of an assembly located outside the ship's hull proper. The assembly is rotatable in relation to the ship. However, a relatively powerful electric motor generates, in addition to the actual propeller power, a considerable amount of heat which has to be removed from the motor. Typically the electric motor is then arranged to be air cooled, since air cooling has been found to be appropriate particularly with respect to reliability of operation and of maintenance. In such a case the cooling ducts in addition provide service access passage to the vicinity of the motor. One of the disadvantages of air cooling is, however, the large space requirements of the arrangements. There also have been attempts to implement cooling arrangements operating with liquid, for instance, whereby the actual cooling device is located outside the propulsion unit, but in practice such a solution has proved rather complicated, considering that the azimuthing unit as such is adapted to be rotatable. Attempts further have been made to construct motors in such a way, that their cooling would take place via the outer casing of the motor housing surrounding the motor, but these solutions have not worked to satisfaction, and they have always required the use of motors based only on a certain particular working principle.

In a co-pending patent application the design of the motor in itself is proposed to constitute an extremely compact modular unit, which at one end thereof can be attached to a ship and which the opposite end comprises propeller means. In that solution there is no actual motor housing, but the motor is attached as such to the ship or to an arm structure supported rotatably with respect to the ship. Particularly in connection with the azimuthing propulsion system mentioned above many significant advantages are achieved by using such a module arrangement. One such arrangement additionally enables a solution to the problem of cooling of the motor.

The characteristic features of the solution according to the present invention are presented in the accompanying claims.

Thus, the present invention is characterized in that the motor unit comprises such an electric motor for which an essential portion of the cooling takes place via the motor's whole circumferential surface directly to a medium located outside the unit, immediately through any possible casing structure which structurally and functionally is a part of the motor. In some embodiments no clear casing structure can even be defined, in which case the motor's structure as such additionally constitutes a casing, and the scope of the present invention includes such embodiments as well. Consequently, the arrangement according to the present invention thus appropriately comprises a motor, which as such is in direct contact with the water around the ship. Thus, the motor is not positioned within any special motor housing of any assembly associated with the ship, but the motor rather in itself constitutes a part of the casing of such a structure.

Figure 2:
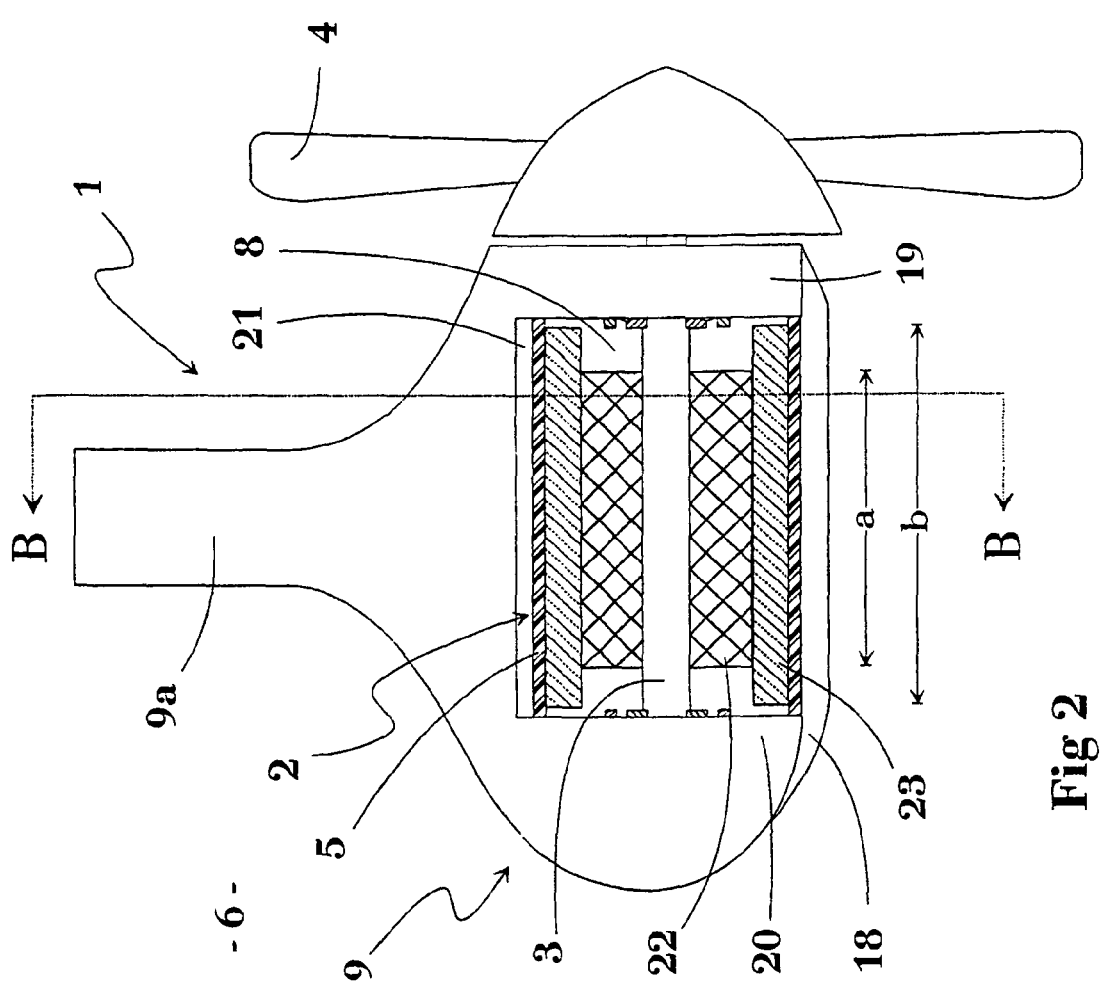

The present invention will now be presented in more detail with reference to some favorable embodiments and to the accompanying drawings, where FIG. 1 as a schematic sectional view discloses an example of an embodiment of a motor arrangement according to the present invention in connection with an azimuthing propulsion system, FIG. 2 partially in section discloses an alternative installation arrangement, FIG. 2a in a corresponding manner discloses a section at B—B in FIG. 2, and FIG. 3 discloses a solution, wherein a motor unit according to the present invention is arranged as a rigid propulsion means in the stern of a ship, thus replacing a conventional propeller arrangement.

Referring to FIG. 1 a modular motor unit 1 according to the present invention generally comprises an electric motor 2 having a propeller 4 arranged at a motor shaft 3. According to the present invention an outer casing 5 for said motor unit is arranged so that the motor 2 as such is cooled by the surrounding water 6 directly through said casing 5 which is structurally associated with said motor. The motor's 2 shaft 3 is supported, in a manner known Per se, at both ends of the motor by means of bearings 7 to which gaskets known per se suitably are arranged so that the interior 8 of the motor favorably is completely isolated from the surrounding water 6, and suitably also from the interior 10 of an attachment assembly 9.

The motor unit is provided with fastening means which suitably are flanges 11, by means of which the motor unit can be attached to corresponding flange means 16, 16a, 16b arranged at said attachment assembly 9, or to means 16c arranged directly on the ship's hull 12 as disclosed in FIG. 3. FIG. 1 further discloses by means of a schematic reference 13 that connections to the motor 2, such as power supply, control and monitoring devices, any lubrication means etc. favorably are connected by means of a central connector to said attachment assembly 9 or to the ship's hull 12, respectively, which renders the attachment as efficient as possible.

Many significant advantages are achieved by the general arrangement according to the present invention. Since the motor unit can be given an extremely compact design it can be effectively cooled directly without using other cooling systems. Thus, the arrangement according to the invention enables attachment systems for the propulsion unit to be considerably slimmer than before, which provides a surface area and thus also, e.g., a frontal area meeting the water flow, which areas are smaller than known in prior art. In practice, omitting any separate cooling arrangements passing through the azimuthing assembly also implies that the portion of the assembly, which is attached to the ship 12, can be considerably smaller than earlier structures. The cooling arrangement according to the present invention results in a still more compact structure, since in most cases the cooling and the special arrangements used in present devices of this kind can be completely omitted. As a result, the production of the motor unit becomes easier and faster, and the weight of the unit remains small and thus, accordingly, the equipment needed for the production of the unit can be smaller as well.

Since it, to a wide extent, is a matter of a standardized assembly, which as such is applicable to a great number of different uses, the motor unit 2, which as such contains even quite complicated technology, can be manufactured in long series with insignificant consideration of the end use. This also ensures, that the supply of spare parts for the motor unit can be very extensive, to start with having complete units as such available as goods in stock at the main ship-yards or even carried on board the ship.

Due to its compact design, the arrangement according to the present invention provides a significantly smaller cross section in the direction of the flow, as compared with present ones, whereby a better propulsion efficiency is achieved using a smaller propeller. Also, it is usually possible to use smaller bearings 7.

From the aspects of product delivery and maintenance, the arrangement according to the present invention enables fast production and shorter stock turnover time. Maintenance is fast and simple due to inter-changeability and standard models, which is a significant advantage considering the fact, that ship lay days for maintenance or repair can become extremely expensive.

Preferably the arrangement disclosed in FIG. 1 is functionally equivalent to the azimuthing propulsion system described above, i.e. the whole assembly 9 is rotatable around a vertical axis A—A. Thus, an assembly including a motor replaces the propeller-rudder assembly of the earlier technology, which in comparison to earlier technology provides i.a. clearly better efficiency and improved turning characteristics. The assembly 9 in the embodiment according to FIG. 1 favorably comprises an essentially hollow and suitably at least to some extent curved body portion which is attached by means of flanges to arrangements for turning, power supply, and control, known per se are known in the art, and which are referred to only indicatively by reference number 14. Due to the curved attachment assembly, the whole device pivots in an optimal way in a similar manner as known azimuthing propulsion devices.

A modular structure implemented in accordance with the teaching of a co-pending further ensures that symmetry necessary for a balanced cooling particularly easily can be achieved. Due to the favorably modular embodiment the unit has no such external parts, which would cause any points of discontinuity in respect to cooling, but rather allows access everywhere for the surrounding water 6 to serve as a coolant.

However, according to one embodiment further arrangements have been taken, if necessary, so that there is a heat conducting medium in the motor 2 or at its most sensitive location, which medium can be set in motion, i necessary, by means of suitable pumping or the like means 17 in order to enhance the heat transfer. Additionally, the structures and space 10 of the arm assembly supporting the motor unit can be utilized so that in particularly hot conditions additional cooling media can be circulated therein. In some embodiments the motor unit 1 in itself, as well as possibly also the arm assembly 9 supporting it, are provided with cooling fins 18 or similar formations which facilitate a heat transfer.

FIGS. 2 and 2a disclose an alternative attachment arrangement, wherein the attachment assembly supporting the motor comprises an essentially vertical central body 9a with suitably circular portions 19, 20 supporting the motor unit 1. These portions 19, 20 preferably surround just a part of the motor unit 1 so that a clear opening 21 remains between the central portion of the motor unit 1 and the assembly 9. This opening, which suitably extends at least over the axial length "a" of the rotor 22, favorably, however, at least also over the length "b" of the stator 23, renders it possible for the medium 6 outside the unit, usually water, to be in contact with the heat emitting portions of the motor at least at the longitudinally central portion of the motor 2, in particular with the whole circumference of the portion of the casing 5, which favorably is immediately adjacent to the stator. Thus, water can flow in the vicinity of that entire surface portion of the motor unit, which portion is directly adjacent to such portions of the motor 2, where heat is actually generated. The structure disclosed in FIG. 2 comprises an arrangement wherein an annular portion 19 surrounds one end of the motor assembly 1, while an attachment portion 20 located at the opposite end alternatively also can be just an attachment flange arrangement 11, 16 similar to the one disclosed in FIG. 1. In another embodiment said annular portion 19 has been replaced by separate fasteners (not shown) and in another embodiment an annular portion 19 has been completely omitted.

In the embodiments above according to FIGS. 1 and 2 the motor units 1, 1a according to the present invention are disposed to rotatable arm assemblies 9 in order to provide an azimuthing propulsion system. FIG. 3, again, discloses a solution where, instead of a conventional propeller assembly, a modular motor unit 1 according to the present invention is attached directly to the hull of a ship 12. A considerable part of the advantages offered by the modular structure and the direct cooling arrangement according to the present invention also can be achieved in this case.

Above some favorable embodiments of the present invention have been disclosed by way of example, but for a person skilled in the art it will be clear that the invention is not limited to those alone, but that it can be modified also in many other ways within the scope of the appended claims.

The invention claimed is:

1. A propulsion unit arrangement for a ship, the arrangement comprising a motor unit located in water, said motor unit including an electric motor, a plurality of associated control devices, and a propeller arranged at an end of a motor shaft extending from an end of the motor unit, wherein cooling of the electric motor is effected over an entire circumferential surface area of the electric motor directly to the ambient water through a casing of the electric motor, wherein a lower end of an attachment assembly supports the motor unit, the attachment assembly being rotatable around a vertical axis and attached to the ship through an essentially horizontal bottom of the ship, wherein an upper end of the attachment assembly is attached to an arrangement means for turning the motor unit, for supplying power to the electric motor, and for controlling the motor unit arranged on the attachment assembly, wherein the attachment assembly is at least partially curved relative to the vertical axis, and wherein the motor unit is attached to the attachment assembly at an axial end of the motor unit opposite to the propeller at a point offset from the vertical axis.

2. The arrangement according to claim 1, wherein the circumferential surface area used for said cooling purposes extends in an axial direction at least for a length of a rotor of the electric motor.

3. The arrangement according to claim 1, further comprising:

means provided in association with the motor unit for setting in motion a separate medium located in the motor unit to enhance heat transfer between the electric motor and the ambient water.

4. The arrangement according to claim 1, wherein an external surface of the attachment assembly forms part of a cooling system for at least a part of the electric motor.

5. The arrangement according to claim 4, further comprising:

means provided in association with the motor unit for setting in motion a separate medium located in the motor unit to enhance heat transfer between the electric motor and the ambient water;

wherein the means for setting in motion is arranged in the supporting attachment assembly.

6. The arrangement according to claim 1, wherein an external surface of the motor unit is provided with formations which facilitate heat transfer.

7. The arrangement according to claim 6, wherein the formations are cooling fins.

8. The arrangement according to claim 1, wherein said attachment assembly comprises a supporting beam, at one end of which there are flange means for attaching one end of said motor unit to said attachment assembly.

9. The arrangement according to claim 1, wherein said motor unit includes a modular unit.

10. The arrangement according to claim 1, wherein the circumferential surface area used for said cooling purposes extends in an axial direction at least for a length of a stator of the electric motor.

11. The arrangement according to claim 1, wherein an external surface of the attachment assembly supporting the motor unit is provided with formations which facilitate heat transfer.

12. The arrangement according to claim 11, wherein the formations are cooling fins.

13. The arrangement according to claim 1, wherein an external surface of the motor unit and the attachment assembly are provided with formations which facilitate heat transfer.

14. The arrangement according to claim 13, wherein the formations are cooling fins.

15. A propulsion arrangement for a ship, the arrangement comprising a motor unit located in water, the motor unit including an electric motor, a plurality of associated control devices, and a propeller arranged at an end of a motor shaft, wherein cooling of the electric motor is effected over an entire circumferential surface area of the electric motor directly to ambient water through a casing of the electric motor, wherein an attachment assembly that attaches to an axial end of the motor unit is adapted to be rotatable around a vertical axis so that the attachment assembly is attached to the ship through an essentially horizontal bottom of the ship, wherein an upper end of the attachment assembly, which pivots, comprises an arrangement means for turning the motor unit, for supplying power to the electric motor, and for controlling the motor unit arranged on the attachment assembly, and wherein the attachment assembly is at least partially curved relative to the vertical axis.

16. A propulsion arrangement according to claim 15, wherein the attachment assembly further comprises a supporting beam, and wherein a flange is provided on one end of the supporting beam for attaching one end of the motor unit to the attachment assembly.

17. A propulsion unit arrangement for a ship, the arrangement comprising a motor unit located in water, said motor unit including an electric motor, a plurality of associated control devices, and a propeller arranged at an end of a motor shaft, wherein cooling of the electric motor is effected over an entire circumferential surface area of the electric motor directly to the ambient water through a casing of the electric motor, wherein a lower end of an attachment assembly supports the motor unit, the attachment assembly being rotatable around a vertical axis and attached to the ship through an essentially horizontal bottom of the ship, wherein an upper end of the attachment assembly is attached to an arrangement means for turning the motor unit, for supplying power to the electric motor, and for controlling the motor unit arranged on the attachment assembly, and wherein the attachment assembly is curved relative to the vertical axis from a point where the attachment assembly is attached to the arrangement means to a point where the attachment assembly supports the motor unit.

18. A propulsion unit arrangement for a ship, the arrangement comprising a motor unit located in water, said motor unit including an electric motor, a plurality of associated control devices, and a propeller arranged at an end of a motor shaft extending from an end of the motor unit, wherein cooling of the electric motor is effected over an entire circumferential surface area of the electric motor directly to the ambient water through a casing of the electric motor;

wherein a lower end of an attachment assembly supports the motor unit, the attachment assembly being rotatable around a vertical axis and attached to the ship through an essentially horizontal bottom of the ship, wherein an upper end of the attachment assembly is attached to an arrangement means for turning the motor unit, for supplying power to the electric motor, and for controlling the motor unit arranged on the attachment assembly;

wherein the motor unit is attached to the attachment assembly at an axial end of the motor unit opposite to the propeller at a point offset from the vertical axis wherein an external surface of the attachment assembly forms part of a cooling system for at least a part of the electric motor;

wherein the arrangement further comprises:

means provided in association with the motor unit for setting in motion a separate medium located in the motor unit to enhance heat transfer between the electric motor and the ambient water;

wherein the means for setting in motion is arranged in the attachment assembly.

19. A propulsion unit arrangement for a ship, the arrangement comprising a motor unit located in water, said motor unit including an electric motor, a plurality of associated control devices, and a propeller arranged at an end of a motor shaft, wherein cooling of the electric motor is effected over an entire circumferential surface area of the electric motor directly to the ambient water through a casing of the electric motor, wherein a lower end of an attachment assembly supports the motor unit, the attachment assembly being rotatable around a vertical axis and attached to the ship through an essentially horizontal bottom of the ship, wherein an upper end of the attachment assembly is attached to an arrangement feature for turning the motor unit, for supplying power to the electric motor, and for controlling the motor unit arranged on the attachment assembly, and wherein the attachment assembly is curved relative to the vertical axis from a point where the attachment assembly is attached to the arrangement feature to a point where the attachment assembly supports the motor unit.

20. A propulsion unit arrangement for a ship, the arrangement comprising a motor unit located in water, said motor unit including an electric motor, a plurality of associated control devices, and a propeller arranged at an end of a motor shaft extending from an end of the motor unit, wherein cooling of the electric motor is effected over an entire circumferential surface area of the electric motor directly to the ambient water through a casing of the electric motor, wherein a lower end of an attachment assembly supports the motor unit, the attachment assembly being rotatable around a vertical axis and attached to the ship through an essentially horizontal bottom of the ship, wherein an upper end of the attachment assembly is attached to an arrangement feature for turning the motor unit, for supplying power to the electric motor, and for controlling the motor unit arranged on the attachment assembly, wherein the attachment assembly is at least partially curved relative to the vertical axis, and wherein the motor unit is attached to the attachment assembly at an axial end of the motor unit opposite to the propeller at a point offset from the vertical axis.

21. The arrangement according to claim 20, further comprising:

a feature provided in association with the motor unit for setting in motion a separate medium located in the motor unit to enhance heat transfer between the electric motor and the ambient water;

wherein the feature for setting in motion is arranged in the supporting attachment assembly.

* * * * *